United States Patent
Lee et al.

(10) Patent No.: US 7,952,988 B2
(45) Date of Patent: May 31, 2011

(54) APPARATUS AND METHOD OF CONTROLLING ACTION CHANGE GAP IN MULTI-HOP RELAY CELLULAR NETWORK

(75) Inventors: Mi-Hyun Lee, Seoul (KR); Pan-Yuh Joo, Seoul (KR); Jung-Je Son, Seongnam-si (KR); Jae-Weon Cho, Suwon-si (KR); Hyoung-Kyu Lim, Seoul (KR); Yeong-Moon Son, Anyang-si (KR); Sung-Jin Lee, Seoul (KR); Hyun-Jeong Kang, Seoul (KR); Song-Nam Hong, Seoul (KR); Young-Ho Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1188 days.

(21) Appl. No.: 11/636,852

(22) Filed: Dec. 11, 2006

(65) Prior Publication Data

US 2007/0133388 A1 Jun. 14, 2007

(30) Foreign Application Priority Data

Dec. 10, 2005 (KR) .................. 10-2005-0121202

(51) Int. Cl.
*H04J 11/00* (2006.01)
(52) U.S. Cl. ........ 370/208; 370/338; 370/329; 370/470; 370/315; 370/206; 455/11.1
(58) Field of Classification Search .................. 370/206, 370/208, 338, 329, 315, 470; 455/11.1
See application file for complete search history.

(56) References Cited

U.S. PATENT DOCUMENTS

| | | | |
|---|---|---|---|
| 7,233,771 B2* | 6/2007 | Proctor et al. | 455/11.1 |
| 2002/0086707 A1 | 7/2002 | Struhsaker et al. | |
| 2004/0081131 A1 | 4/2004 | Walton et al. | |
| 2005/0237918 A1* | 10/2005 | Asai et al. | 370/203 |
| 2005/0254442 A1 | 11/2005 | Proctor, Jr. et al. | |
| 2007/0263735 A1* | 11/2007 | Tong et al. | 375/260 |
| 2008/0187068 A1* | 8/2008 | Hashimoto et al. | 375/295 |
| 2009/0046606 A1* | 2/2009 | Wan et al. | 370/280 |

FOREIGN PATENT DOCUMENTS

| | | |
|---|---|---|
| JP | 2000-049691 | 2/2000 |
| JP | 2002-077978 | 3/2002 |
| KR | 1999-0085776 | 12/1999 |
| KR | 1020030057467 | 7/2003 |

OTHER PUBLICATIONS

Shoji Kaneko et al., "A Study of Relaying Efficiency in IEEE 802.16-2004 P-MP Structure", Sep. 7, 2005.
Wen Tong et al., "Flexible TDD Frame of R UL/DL Allocation", IEEE 802.16 Broadband Wireless Access Working Group, May 17, 2004.

* cited by examiner

*Primary Examiner* — Huy D Vu
*Assistant Examiner* — Kibrom T Hailu
(74) *Attorney, Agent, or Firm* — The Farrell Law Firm, P.C.

(57) ABSTRACT

An apparatus and method of controlling an action change gap interval in a multi-hop relay cellular network, includes constructing a first symbol included in a first frame as a first interval for a first action change and a second interval for exchanging data; and constructing a last symbol included in the first frame as a first interval for exchanging data and a second interval for a second action change. Accordingly, the system capacity and the system efficiency can be raised by reducing the overhead due to the action change gap in the cellular network.

38 Claims, 15 Drawing Sheets

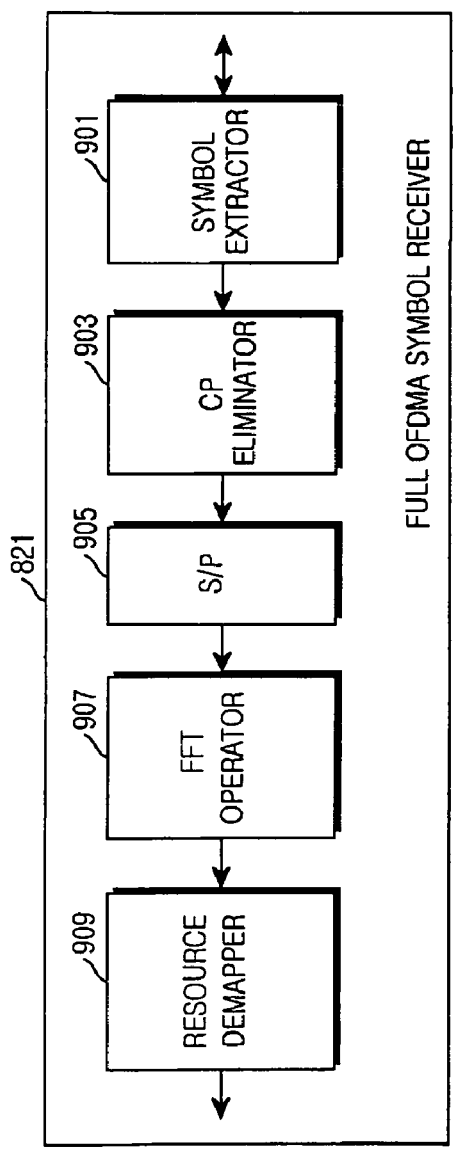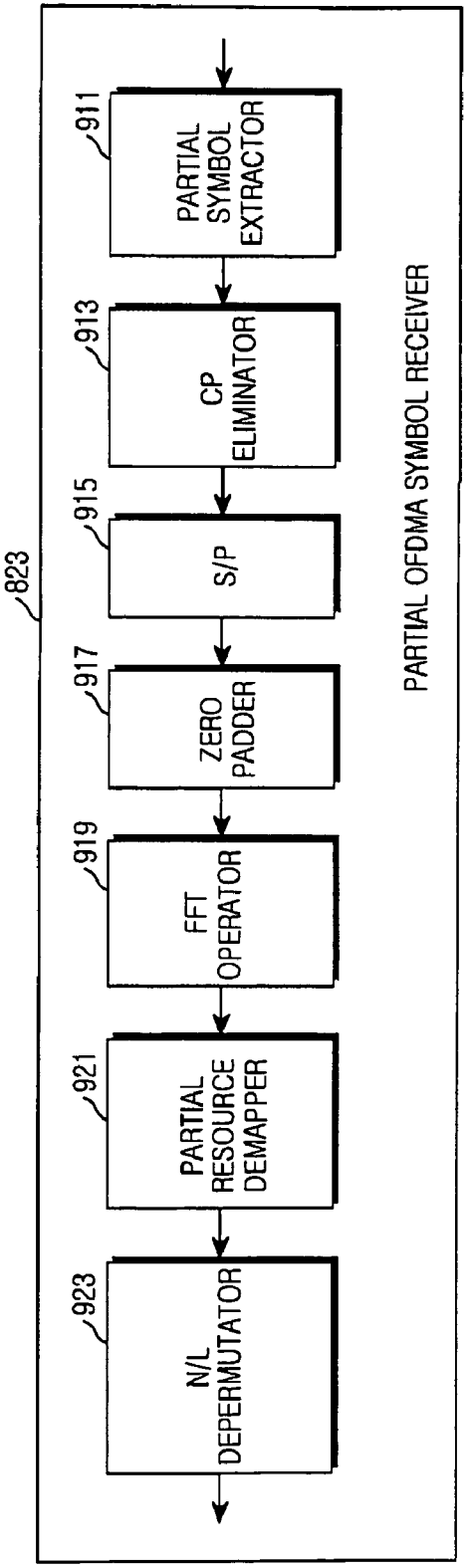
FIG.9A
FIG.9B

APPARATUS AND METHOD OF CONTROLLING ACTION CHANGE GAP IN MULTI-HOP RELAY CELLULAR NETWORK

PRIORITY

This application claims priority under 35 U.S.C. §119 to an application filed in the Korean Intellectual Property Office on Dec. 10, 2005 and assigned Serial No. 2005-121202, the content of which is incorporated herein by reference.

BACKGROUND OF THE INVENTION

1. Field of the Invention

The present invention relates generally to a multi-hop relay cellular network, and in particular, to a subframe structure for flexibly controlling an action change gap (Transmit/Receive Transition Gap (TTG)/Receive/Transmit Transition Gap (RTG)) (TTG/RTG) in a multi-hop relay cellular network and an apparatus for supporting the same.

2. Description of the Related Art

In fourth-generation (4G) mobile communication system, cells having a very small radius are located to enable rapid communications and accommodate more traffic. However, it may be impossible to achieve a centralized design using current wireless network design scheme. This wireless network should be controlled and deployed in a distributed manner and actively adapt to environment changes such as joining of a new base station. To these ends, the 4-G mobile communication system requires configuration of an autonomous adaptive wireless network.

It would be necessary to adopt techniques applied to an ad-hoc network to the mobile communication system for the substantial implementation of the autonomous adaptive wireless network required by the 4-G mobile communication system. A representative example is a multi-hop relay cellular network, in which the multi-hop relay scheme applied to the ad-hoc network is introduced to the cellular network configured with a fixed base station.

Generally, in the cellular network, since communications are conducted through one direct link between a base station and a mobile station, it is easy to establish a highly reliable radio communication link between the base station and the mobile station.

However, since the network configuration has low flexibility because of the fixed base station, it is hard to provide efficient services in a radio environment, which is subject to severe change in traffic distribution or required traffic.

To overcome this shortcoming, it is possible to apply a relay scheme, which delivers data in a multi-hop manner by use of neighboring mobile stations or relay stations. The multi-hop relay scheme can rapidly reconfigure the network under the environment change and enables the efficient use of overall network resources. Also, the multi-hop relay scheme can provide the mobile station with a radio channel of better channel status by building a multi-hop relay path by way of a repeater which is placed between the base station and the mobile station. Furthermore, a high speed data channel can be provided to mobile stations, which cannot communicate with the base station in a shadow area, by means of the multi-hop relay path, to thereby expand the cell area.

FIG. 1 depicts a configuration of a general multi-hop relay cellular network.

As shown in FIG. 1, a mobile station (MS) 110 in a service area 101 of a base station (BS) 100 is connected to BS 100 through a direct link. In contrast, a MS 120 with poor channel status, which resides outside the service area 101 of BS 100, is connected to a relay link via a relay station (RS) 130.

When MSs 110 and 120 suffer poor channel status because they are outside the service area 101 of BS 100 or in a shadow area under the severe shielding by buildings, BS 100 is able to provide better radio channels to MSs 110 and 120 by means of RS 130. Accordingly, by adopting the multi-hop relay scheme, BS 100 can provide high speed data channel in the boundary area of poor channel status and expand the cell service area. In addition, the multi-hop relay cellular network has the BS-MS link, the BS-RS link, and the RS-MS link.

The multi-hop relay scheme of FIG. 1 can set a relay link using a plurality of RSs as shown in FIG. 2.

FIG. 2 depicts a configuration of a general multi-hop cellular network.

As shown in FIG. 2, a BS 201 establishes a communication link to MS 219 using a relay link formed with RSs 211, 213, 215, and 217.

That is, BS 210 is able to expand the communication link to MS 219 using a multi-hop path.

To support the multi-hop relay cellular network, a frame structure as shown in FIG. 3 is utilized.

FIG. 3 depicts a frame structure of a conventional Time Division Duplex (TDD) system. In the following explanation, the horizontal axis indicates the time domain and the vertical axis indicates the frequency domain.

As shown in FIG. 3, a frame 300 includes a downlink (DL) subframe 311 and an uplink (UL) subframe 321. The DL subframe 311 includes a DL signal, which is transmitted from the BS to the MS via RSs. UL subframe 321 includes an UL signal, which is transmitted from the MS to the BS via the RSs.

Between DL subframe 311 and UL subframe 321, there is a Transmit/Receive Transition Gap (TTG) 331, which is a guard region. Between UL subframe 321 of the i-th frame and DL subframe 321 of the (i+1)-th frame, there is a Receive/Transmit Transition Gap (RTG) 341, which is a guard region. In the TTG, the BS changes from the transmit mode to the receive mode and the MS changes from the receive mode to the transmit mode. In the RIG, the BS changes from the receive mode to the transmit mode and the MS changes from the transmit mode to the receive mode. Thus, in the TTG/RTG, the BS and the MS perform the operating mode of signal transmission or signal reception.

To support the multi-hop relay cellular network in the frame structure of the TDD system as above, a subframe structure of FIG. 4 should be used.

FIG. 4 depicts a subframe structure of a general multi-hop TDD system. The multi-hop link signal transmission is carried out by allocating different resources. The horizontal axis indicates the time domain and the vertical axis indicates the frequency domain.

As shown in FIG. 4, allocating different time slots to subframes of each hop link in sequence constitutes a subframe.

Specifically, different time slots are allocated to a first hop 401, which delivers a DL signal from a BS to an RS1 and to a second hop 403 which delivers a DL signal from the RS1 to an RS2, to constitute the subframe.

It is noted that the time slot allocated to each hop may include a single unidirectional link subframe or a super frame consisting of multiple frames.

As noted above, the multi-hop relay cellular network sequentially performs the signal transmission of the hops in the allocated time slot. In this case, the RS of each hop has to receive the signal in the previous hop and to transmit the signal to the next hop. Hence, the "action change gap" is required between the subframes. In general, the TDD frame is short in size, taking into account the feedback delay which affects Transmit Control Protocol (TCP) throughput, Automatic Repeat Request (ARQ)/H-ARQ, and closed loop control performance. Consequently, the plurality of the TTG/RTGs for the multi-hop in the short frame size results in large overhead.

The change of the TTG/RTG can be accomplished simply by the symbol size constituting the frame. However, when the frame is shortened in consideration of the feedback delay, the "action change gap" disadvantageously acts as the large overhead by the integer symbol size.

SUMMARY OF THE INVENTION

An aspect of the present invention is to substantially solve at least the above problems and/or disadvantages and to provide at least the advantages below. Accordingly, an aspect of the present invention is to provide an apparatus and method for reducing the time gap overhead in a multi-hop relay cellular network.

Another aspect of the present invention is to provide a frame construction method for reducing a time gap overhead by flexibly controlling an "action change gap" in a multi-hop relay cellular network, and an apparatus supporting the same.

The above aspects are achieved by providing an operating method of a relay station (RS) to control the "action change gap" interval in a multi-hop relay cellular network, which includes transmitting data in a second interval after performing a first action change in a first interval of a first symbol included in a first sub frame; performing a second action change in a second interval after transmitting data in a first interval of a last symbol included in the first subframe; and receiving data in a second subframe.

According to one aspect of the present invention, an operating method of an RS to control an action change gap interval in a multi-hop relay cellular network, includes transmitting data in a second interval after performing a first action change in a first action of a first symbol included in a first subframe; and receiving data in a second interval after performing a second action change in a first interval of a first symbol included in a second subframe.

According to another aspect of the present invention, an operating method of an RS to control an action change gap interval in a multi-hop relay cellular network, includes performing a first action change in a second interval after transmitting data in a first interval of a last symbol included in a first subframe; and performing a first action change in a second interval after receiving data in a first interval of a last symbol included to a second subframe.

According to a further aspect of the present invention, a transmission apparatus for controlling an action change gap interval in a multi-hop relay cellular network, includes a transmit controller which controls to generate and transmit a partial data symbol and a full data symbol carrying information available to an entire band in each subframe according to a frame construction scheme; a frame constructor which generates data to be transmitted by coding and modulating data under control of the transmit controller; and a transmit symbol generator which constructs a transmit symbol by generating a partial data symbol and the full data symbol using the data under control of the transmit controller.

According to still to another aspect of the present invention, a receiving apparatus for controlling an action change gap in a multi-hop relay cellular network, includes a receive controller which generates a control signal for an action change gap according to a frame construction scheme; and a receiver which detects receive data excluding the action change gap, from a receive signal under control of the receive controller.

According still to another aspect of the present invention, a frame construction method to control an action change gap in a multi-hop relay cellular network, includes constructing a first symbol included in a first frame as a first interval for a first action change and a second interval for transmitting or receiving data; and constructing a last symbol included in the first frame as a first interval for transmitting or receiving data and a second interval for a second action change.

According still to another aspect of the present invention, a frame construction method to control an action change gap in a multi-hop relay cellular network, includes constructing a first symbol included to a first frame as a first interval for a first action change and a second interval for transmitting or receiving data; and constructing a first symbol included in a second frame as a first interval for a second action change and a second interval for receiving or transmitting data.

According still to another aspect of the present invention, a frame construction method to control an action change gap in a multi-hop relay cellular network, includes constructing a last symbol included in a first frame as a first interval for transmitting or receiving data and a second interval for a first action change; and constructing a last symbol included in a second frame as a first interval for receiving or transmitting data and a second interval for a second action change.

BRIEF DESCRIPTION OF THE DRAWINGS

The above and other objects, features and advantages of the present invention will become more apparent from the following detailed description when taken in conjunction with the accompanying drawings in which.

Figure 5A:
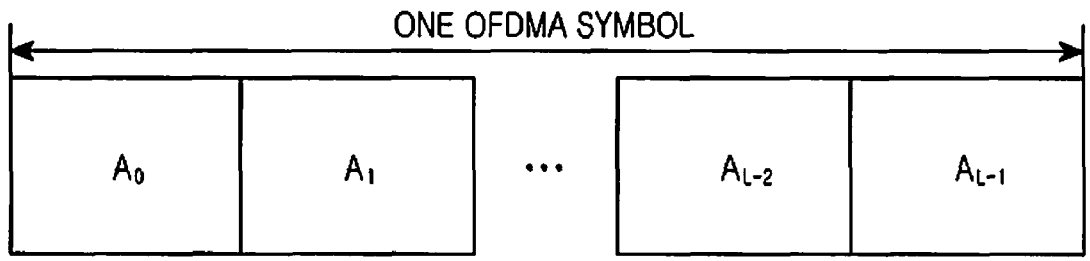
Figure 5B:
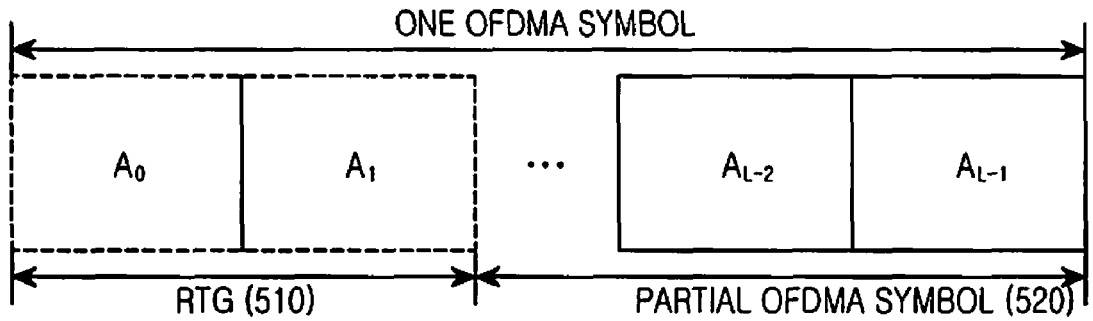
Figure 5C:
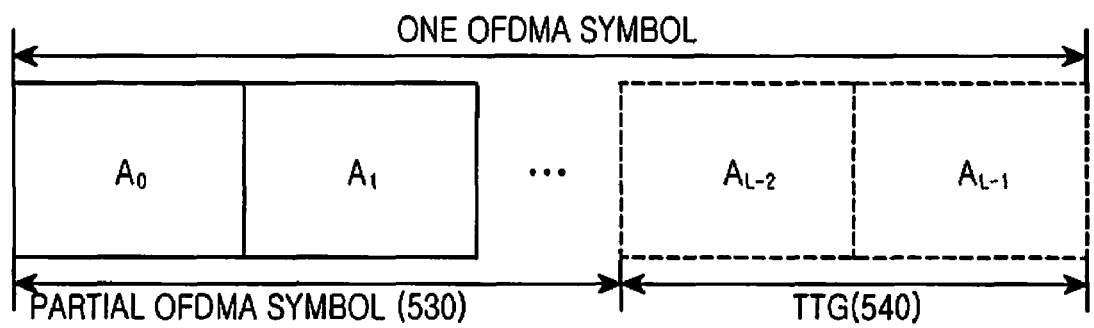
Figure 6:
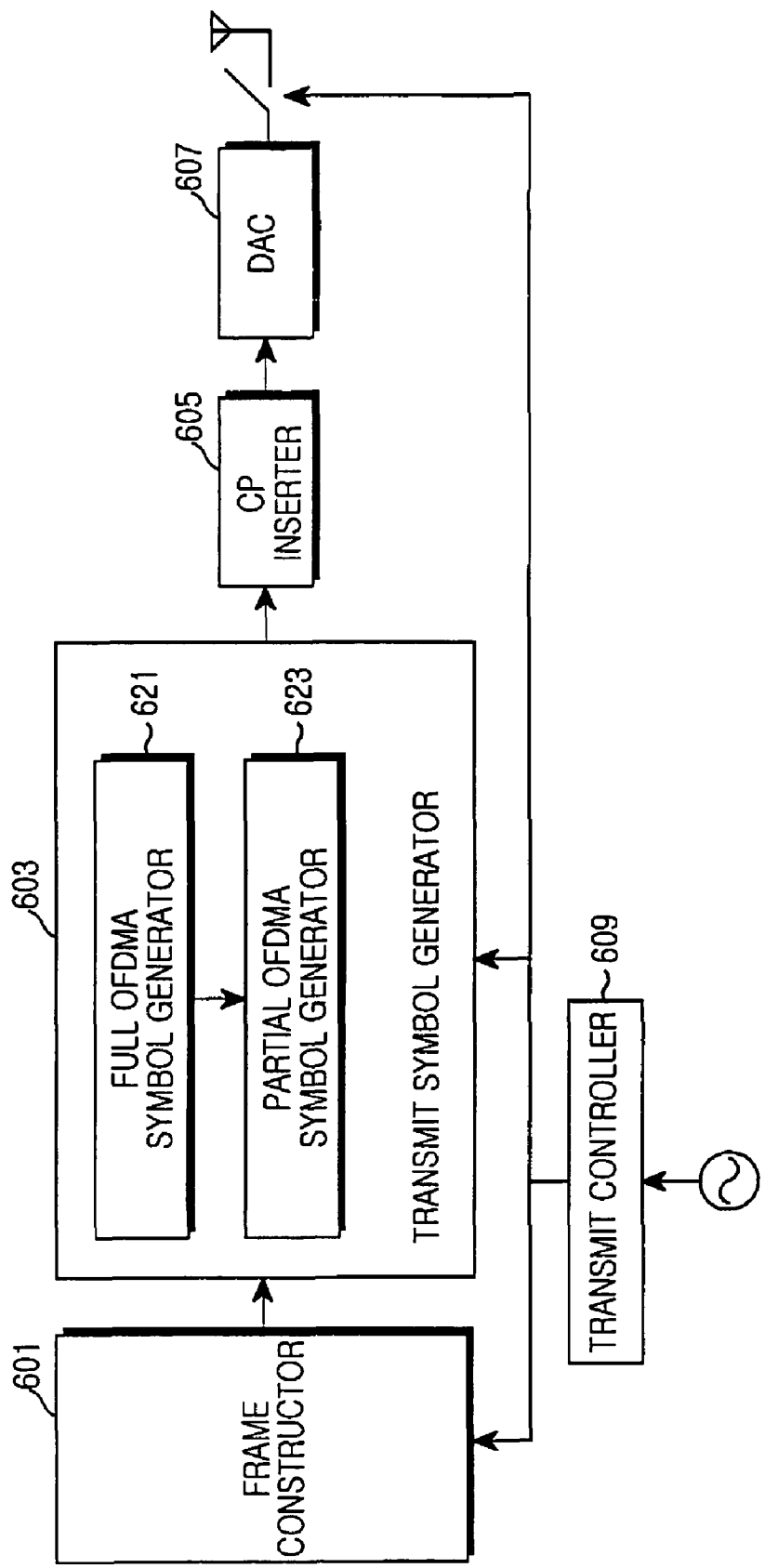
Figure 7A:
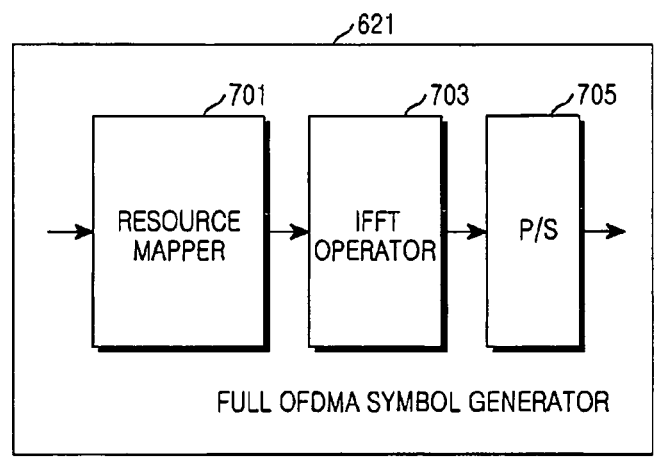
Figure 7B:
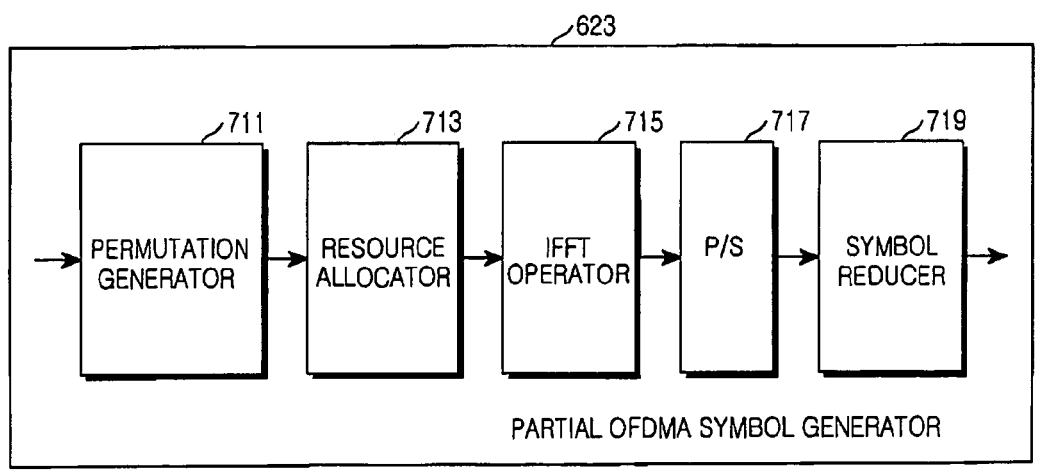
Figure 8:
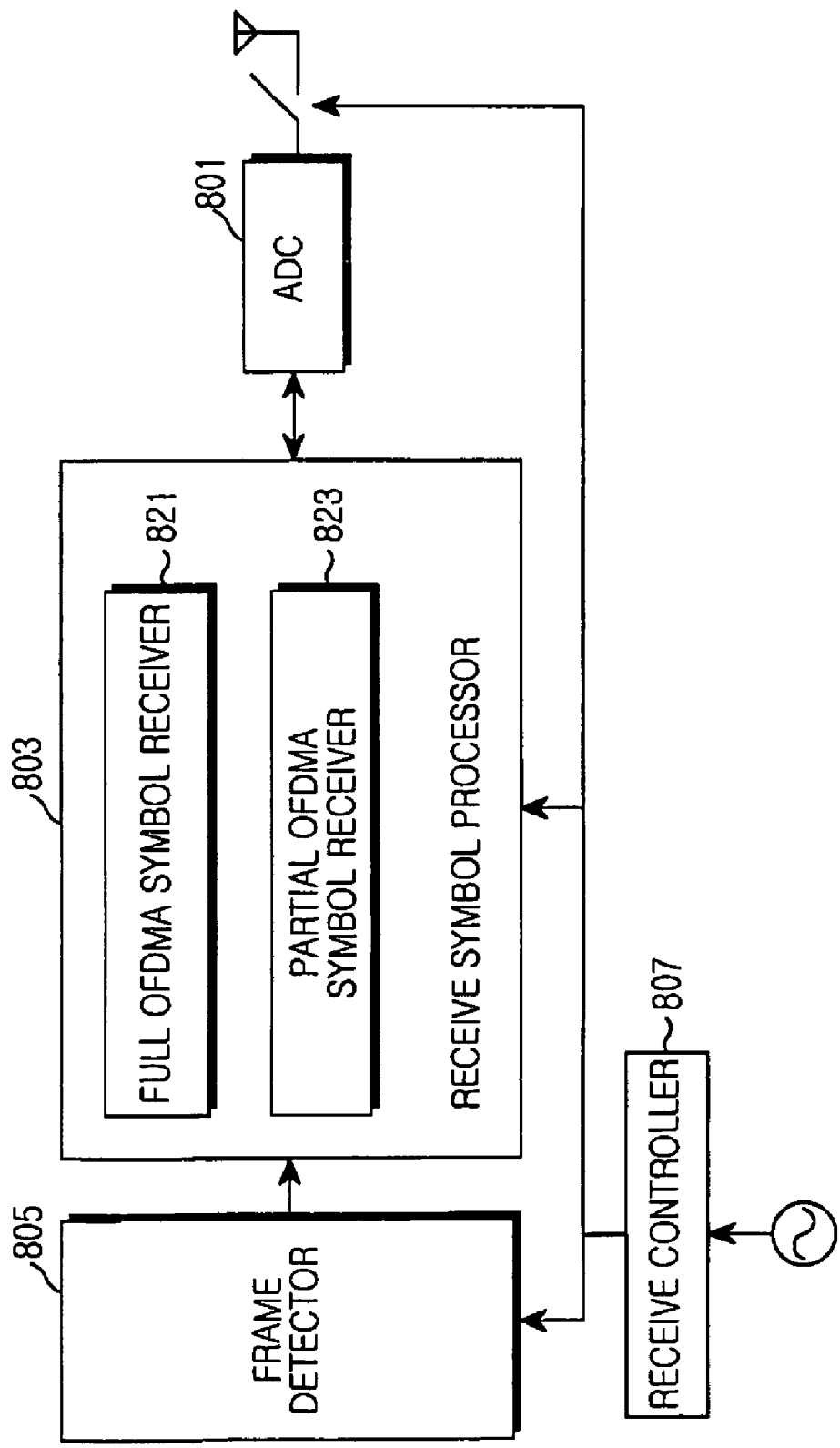
Figure 10:
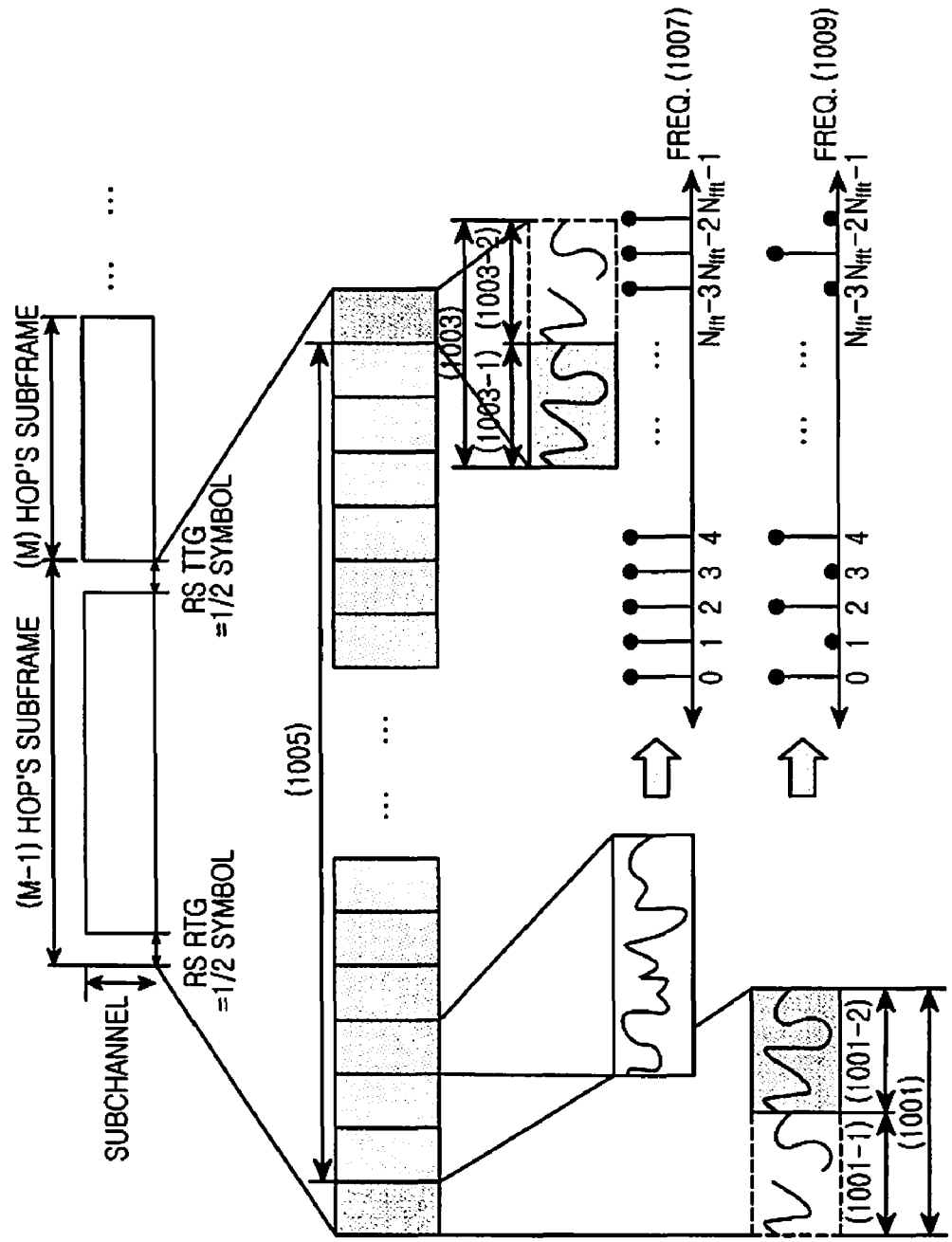
Figure 11:
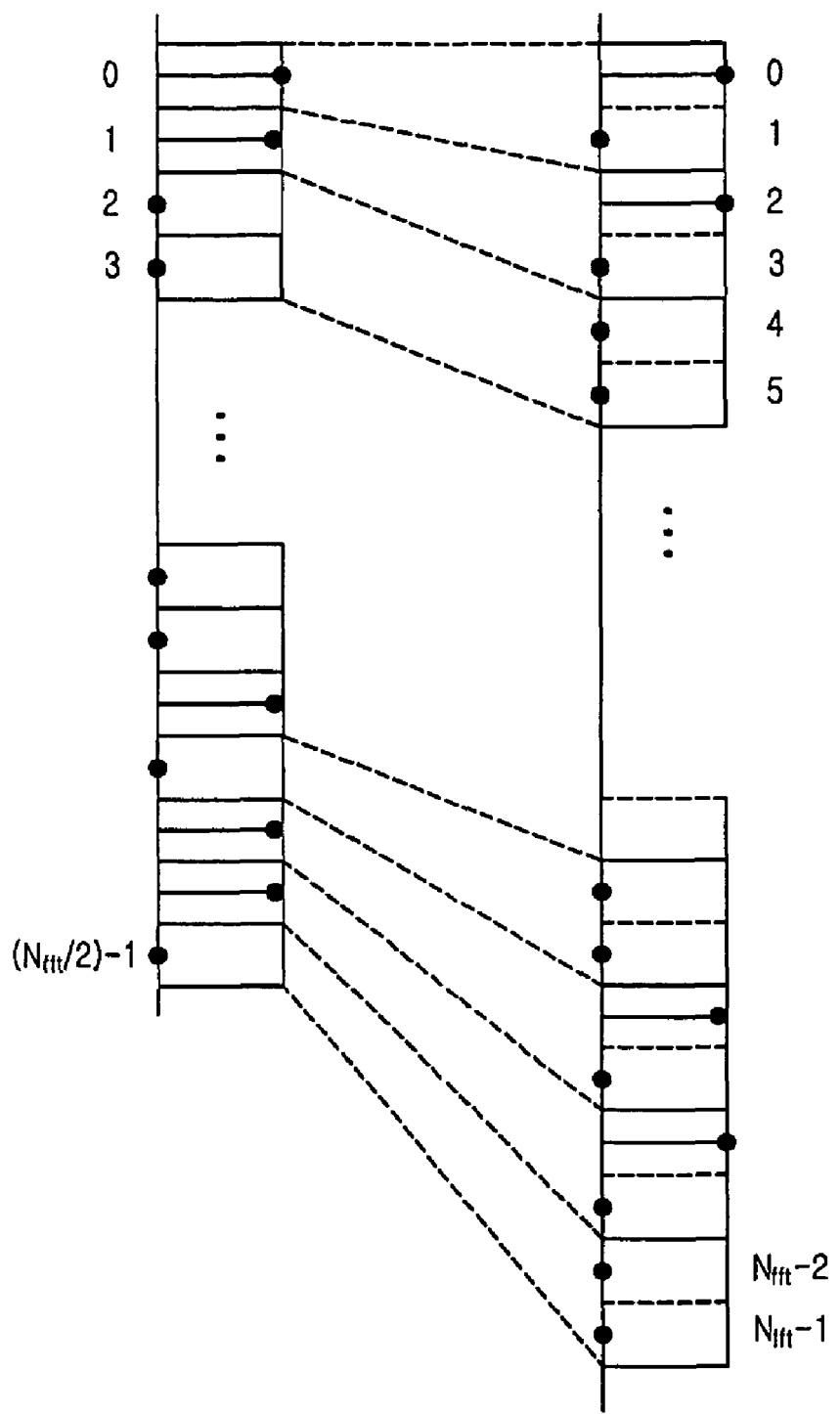
Figure 12:
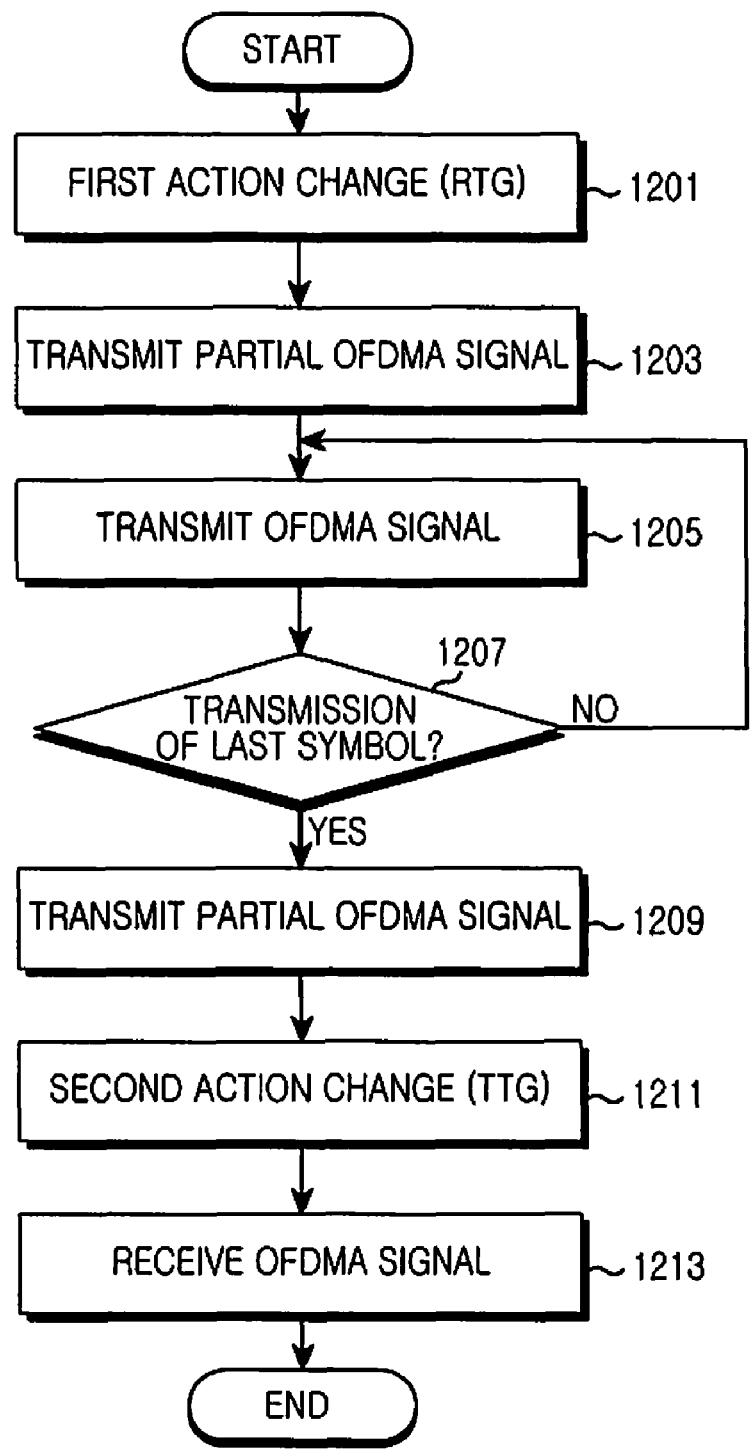
Figure 13:
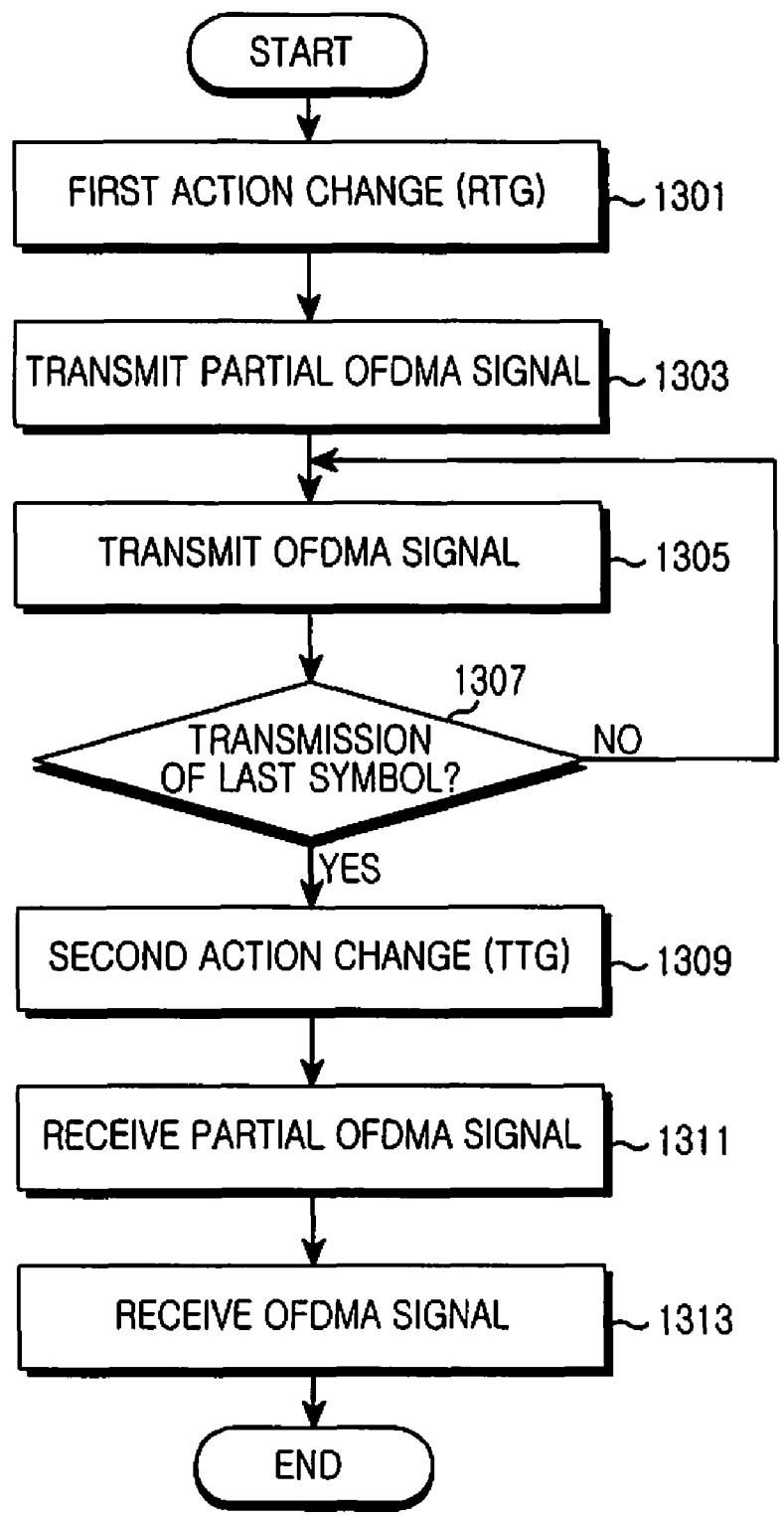
Figure 14:
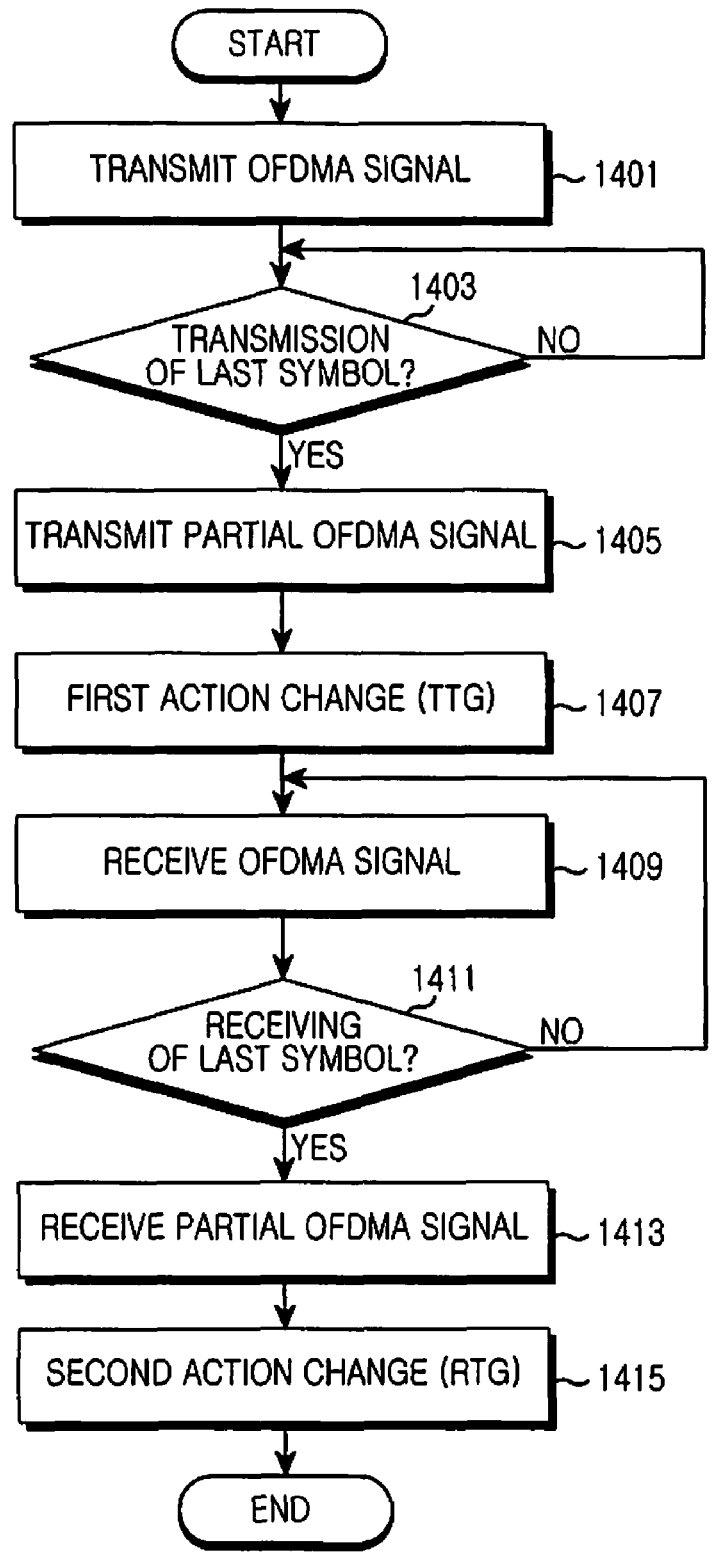
Figure 15A:
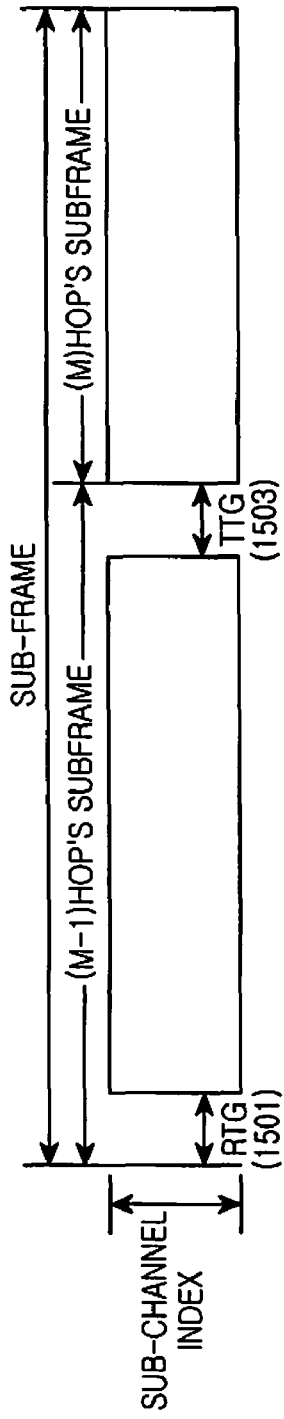
Figure 15B:
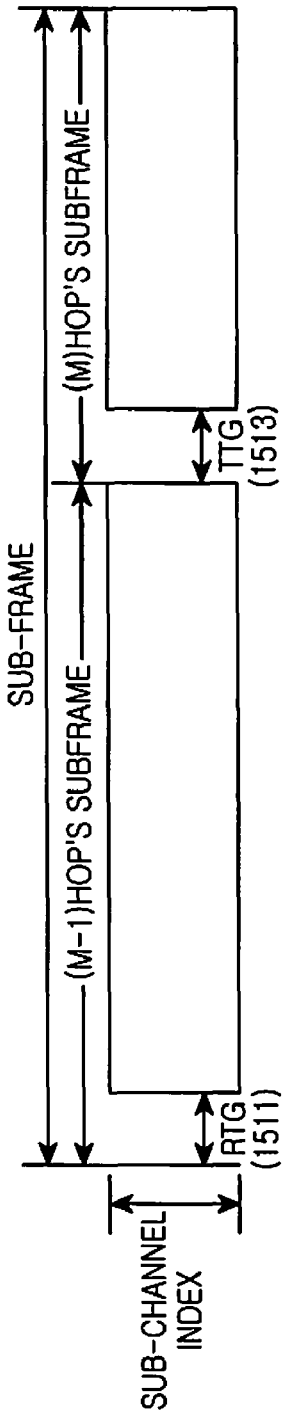
Figure 15C:
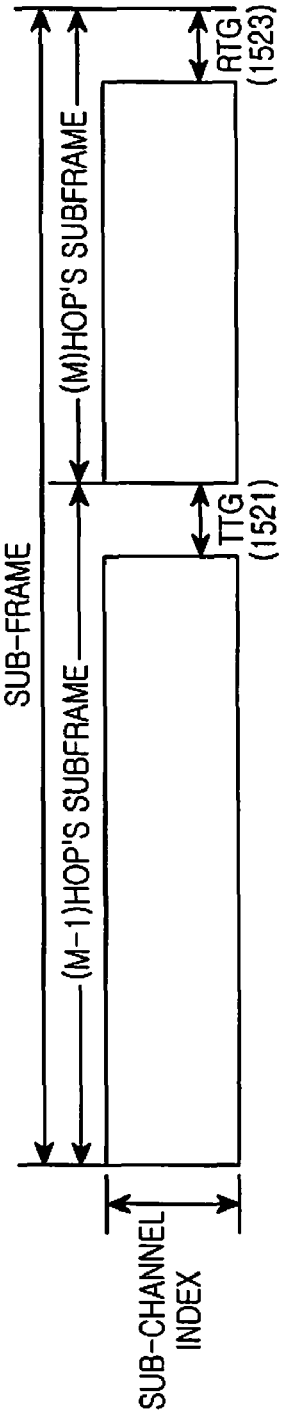

Each of FIGS. 5A to 5C illustrates interleave OFDMA symbol which uses an action change gap in a multi-hop relay cellular network according to the present invention;

FIG. 6 is a block diagram of a RS transmitter in the multi-hop relay cellular network according to the present invention;

FIGS. 7A and 7B are detailed block diagrams of a transmit symbol generator of the RS transmitter in the multi-hop relay cellular network according to the present invention;

FIG. 8 is a block diagram of a RS receiver in the multi-hop relay cellular network according to the present invention;

FIGS. 9A and 9B are detailed block diagrams of a receive symbol processor of the RS receiver in the multi-hop relay cellular network according to the present invention;

FIG. 10 illustrates a subframe structure, which uses an action change gap for the multi-hop transmission in the multi-hop relay cellular network according to the present invention;

FIG. 11 illustrates the interleave OFDMA symbol frame in a multi-hop relay cellular network according to the present invention;

FIG. 12 is a flowchart outlining a process to place RTG/TTG in a subframe in the multi-hop relay cellular network according to the present invention;

FIG. 13 is a flowchart outlining a process to place RTG/TTG in different subframes in the multi-hop relay cellular network according to the present invention;

FIG. 14 is a flowchart outlining a process to place RTG/TTG in different subframes in the multi-hop relay cellular network according to the present invention; and FIGS. 15A to 15C illustrate positions of RTG/TTG in the frame structure in the multi-hop relay cellular network according to the present invention.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a subframe construction method for reducing a time gap overhead by flexibly controlling the size of action change gap (TTG/RTG) in a multi-hop relay cellular network, and an apparatus for supporting the same. In the following description, TDD and Orthogonal Frequency Division Multiplex Access (OFDMA) wireless communication systems are exemplified. The present invention is applicable to other multiple access schemes. The present invention controls the size of TTG/RTG, the action change gap by use of iterative characteristic of an Interleaved-OFDMA signal.

FIG. 5A shows the interleaved-OFDMA symbol, FIG. 5B shows a RTG and the interleaved-OFDMA symbol, and FIG. 5C shows the interleaved-OFDMA symbol and a TTG.

As shown in FIG. 5A, to generate a partial OFDMA symbol in the interleaved-OFDMA symbol including the action change gap. N-ary subcarriers are divided to L-ary subchannels having M-ary subcarriers. That is, N=M×L. When information is mapped to the subcarriers at uniform intervals and the subcarriers are transmitted, the inverse fast Fourier transformed OFDMA signal is constituted such that M-length sequence is repeated L-times in a symbol duration.

As shown in FIGS. 5B and 5C, the TTG or the RTG interval utilizes a certain number of subchannels among the L-ary subchannels repeating at uniform intervals, rather than the entire subcarrier of the symbol sharing the action change gap (TTG/RTG).

As shown in FIG. 5B, the cellular network forms a first symbol of the subframe using the action change gap. As shown in FIG. 5A, the iterative M-ary subcarriers by R-times are used as the action change gap. Herein, R, which is a constant smaller than L, denotes the length of the action change gap and is predefined at the system configuration.

More specifically, the cellular network performs the action switching in the RTG interval 510, which may be referred to as a first interval of the symbol, where the M-ary subcarriers are repeated R-times and transmits the partial OFDMA signal in the interval 520, which may be referred to as a second interval of the symbol, where the M-ary subcarriers are repeated (L-R) times, rather than by performing the action change gap or the OFDMA signal transmission using the entire subcarrier constituting one symbol. For instance, as shown in FIGS. 5A to 5C, one OFDMA symbol consists of M sequences $(A_0, A_1, \ldots, A_{L-2}, A_{L-1})$ repeating L times. The first two iterative intervals are used as the action change gap and the other (L-2)-ary iterative intervals carry the partial OFDMA symbol.

As shown in FIG. 5C, the cellular network can form the action change gap using the last symbol of the subframe. In this case, as shown in FIG. 5A, the action change gap utilizes the subchannels by T times as many as the M-ary iterative subcarriers. T, which is a constant smaller than L, denotes the length of the action change gap and is predefined at the system configuration.

Rather than to transmit the action change gap or the OFDMA signal using the entire subcarrier constituting one symbol, the cellular network transmits the partial OFDMA signal in interval 530, which may be referred to below as a first interval of the symbol, where the M-ary subcarriers are repeated (L-T) times and uses as the action change gap the TTG interval 540, which may be referred to below as a second interval of the symbol, where the M-ary subcarriers are repeated T times. For instance, as shown in FIGS. 5A to 5C, one OFDMA symbol consists of M sequences $(A_0, A_1, \ldots, A_{L-2}, A_{L-1})$ repeating L times. When the last two iterative intervals are used as the action change gap, the OFDMA partial symbol is carried in the (L-2)-ary iterative intervals and the rest two iterative intervals are used as the action change gap.

FIG. 6 is a block diagram of an RS transmitter in the multi-hop relay cellular network according to the present invention. Hereinafter, an RS, which transmits a DL subframe is exemplified and a BS and a MS transmitting the DL subframe act the same as the RS. The present invention is true for an RS, a BS, and a MS which transmit a UL subframe.

As shown in FIG. 6, the transmitting apparatus includes a frame constructor 601, a transmit symbol generator 603, a Cyclic Prefix (CP) inserter 605, a Digital/Analog Converter (DAC) 607, and a transmit controller 609.

The frame constructor 601 codes a signal provided from an upper stage according to a preset coding rate and modulates the coded signal according to a corresponding modulation scheme (e.g., BPSK, QPSK, and QAM).

The transmit symbol generator 603 generates an OFDMA symbol to transmit using data provided from the frame constructor 601 under the control of the transmit controller 609. In doing so, the transmit symbol generator 603 includes a partial OFDMA symbol generator 623, which generates a partial OFDMA symbol by the action change gap, and a full OFDMA symbol generator 621. The full OFDMA symbol generator 621 and the partial OFDMA symbol generator 623 are constructed as shown in FIGS. 7A and 7B.

CP inserter 605 inserts a CP to the OFDMA symbol generated at transmit symbol generator 603 in order to prevent inter-symbol interference and outputs the CP-inserted symbol. DAC 607 converts the digital signal fed from CP inserter 605 to an analog signal and outputs the analog signal.

Transmit controller 609 transmits the output signal of DAC 607 via an antenna by turning on a transmit switch in the DL subframe according to the TDD frame structure. Other than the DL subframe interval, the signal transmission is blocked by turning off the transmit switch. In addition, transmit controller 609 governs transmit symbol generator 603 and frame constructor 601 so that full symbol generator 621 and partial symbol generator 623 of transmit symbol generator 603 execute a corresponding operation for the action change gap.

FIGS. 7A and 7B are detailed block diagrams of the transmit symbol generator of the RS transmitter in the multi-hop relay cellular network according to the present invention.

FIG. 7A shows a detailed block diagram of the full OFDMA symbol generator 621 and FIG. 7B shows a detailed block diagram of the partial OFDMA symbol generator 623.

As shown in FIG. 7A, the full OFDMA symbol generator 621 includes a resource mapper 701, an Inverse Fast Fourier Transform (IFFT) operator 703, and a Parallel/Series (P/S) converter 705.

Resource mapper 701 generates a subchannel according to a preset resource allocation scheme (e.g., block scheme, interleave scheme, and block-interleave scheme) using the data provided from frame constructor 601, maps the subchannel to the entire frequency band, and outputs it.

IFFT operator 703 processes the signal mapped to the full frequency band, which is provided from resource mapper 701, and outputs a time domain signal. P/S converter 705 converts the parallel data fed from IFFT™ operator 703 to serial data and outputs the serial data.

Partial OFDMA symbol generator 623, as shown in FIG. 7B, includes a permutation generator 711, a resource allocator 713, an IFFT operator 715, a P/S converter 717, and a symbol reducer 719.

Permutation generator 711 constructs a subchannel using data provided from frame constructor 601 according to a preset resource allocation scheme to generate the partial OFDMA symbol. For doing so, permutation generator 711 utilizes a permutation generator of size N/L.

Resource allocator 713 maps the subchannel generated at permutation generator 711 to the subcarrier of the entire band at uniform intervals. For instance, resource allocator 713 maps the subchannel mapped to the M-ary subcarriers as shown in FIG. 5A, to the entire band at uniform intervals.

IFFT operator 715 generates an OFDMA symbol of the time domain by processing the signal fed from resource allocator 713. For instance, IFFT operator 715 constructs one OFDMA symbol with the M sequences ($A_0, A_1, \ldots, A_{L-2}, A_{L-1}$) repeating L times as shown in FIG. 5A.

P/S converter 717 converts the parallel data fed from IFFT operator 715 to serial data and outputs the serial data.

Symbol reducer 719 generates the partial OFDMA symbol as shown in FIGS. 5B and 5C by removing partial iterative sequence of the L-ary iterative sequences in the OFDMA symbol converted to the serial data at P/S converter 717. The position and the number of the removed sequences are predefined at the system configuration and controlled by transmit controller 609. The removed sequence interval is used as the action change gap.

As shown in FIG. 8, the RS receiver includes an Analog/Digital Converter (ADC) 801, a receive symbol processor 803, a frame detector 805, and a receive controller 807.

Receive controller 807 passes an analog signal received on an antenna by turning on a receive switch in an UL subframe interval according to the TDD frame structure. By contrast, receive controller 807 blocks the signal incoming on the antenna by turning off the receive switch in intervals other than the UL subframe interval. Also, receive controller 807 governs receive symbol processor 803 so that a full symbol receiver 821 and a partial symbol receiver 823 of the receive symbol processor 803 perform a corresponding operation for the action change gap.

Receive controller 807 controls frame detector 805 to extract only a subframe to be received at the RS from the frame received through the antenna according to the frame structure.

ADC 801 converts an analog signal received on the antenna to a digital signal and outputs the digital signal.

Receive symbol processor 803 divides the receive data fed from ADC 801 to a partial symbol and a full symbol sharing the action change gap and provides them to full symbol receiver 821 and partial symbol receiver 823, respectively, under the control of receive controller 807. At this time, since the receiving apparatus is aware of the frame structure transmitted from the transmitting apparatus in advance, it can distinguish the partial symbol (the first symbol or the last symbol of the subframe) from the full symbol sharing the action change gap of the transmit frame. Full symbol receiver 821 and partial symbol receiver 823 are configured as shown in FIG. 9.

FIG. 9A shows a detailed configuration of full symbol receiver 821 and FIG. 9B shows a detailed configuration of partial symbol receiver 823.

Full symbol receiver 821, as shown in FIG. 9A, includes a symbol extractor 901, a CP eliminator 903, a Series/Parallel (S/P) Converter 905, an FFT operator 907, and a resource demapper 909.

Symbol extractor 901 extracts one of symbols, which does not share the action change gap. CP eliminator 903 removes a CP from the extracted symbol and outputs the CP-removed symbol.

S/P converter 905 converts the CP-removed serial data of CP eliminator 903 to parallel data. Next, HT operator 907 processes the time domain signal fed from S/P converter 905 and outputs a frequency domain signal.

Resource demapper 909 extracts a subcarrier signal, which is mapped to the entire band of the signal fed from FFT operator 907.

Partial symbol receiver 823, as shown in FIG. 9B, includes a partial symbol extractor 911, a CP eliminator 913, an S/P converter 915, a zero padder 917, an FFT operator 919, a partial resource demapper 921, and a N/L depermutator 923.

Partial symbol extractor 911 extracts a partial symbol excluding the interval used as the action change gap from the digital signal sharing the action change gap. CP eliminator 913 removes the CP from the partial symbol extracted at symbol extractor 911 and outputs the CP-removed symbol.

S/P converter 915 converts the serial data, from which the CP is removed at CP eliminator 913, to parallel data. Next, zero padder 917 restores the OFDMA symbol length by padding a zero sequence as long as the action change gap into the partial symbol fed from S/P converter 915.

FFT operator 919 outputs a frequency domain signal by processing the OFDMA symbol restored at zero padder 917.

Partial resource demapper 921 extracts the subchannel mapped to the subcarrier of the whole band from the signal provided from FFT operator 919.

N/L-depermutator 923 extracts the signal mapped to the subchannel, which is provided from partial resource demapper 921.

Frame extractor 805 extracts and restores information to receive within the frame from the signal fed from symbol receiver 903 under the control of receive controller 807.

As above, the transmitting apparatus generates the partial OFDMA symbol for the action change gap as shown in FIG. 10.

FIG. 10 illustrates a subframe structure, which uses an action change gap for the multi-hop transmission in the multi-hop relay cellular network according to the present invention. The following explanation exemplifies a subframe structure, which uses ½ interval of the OFDMA symbol as TTG or RTG.

As shown in FIG. 10, the (M−1)-hop subframe and the (M)-hop subframe each consist of a plurality of OFDMA symbols and are distinguished by the action change gap RTG and TTG.

The (M−1)-hop subframe includes both action change gaps, i.e., RTG (1001-1) and TTG (1003-2), in a first symbol (1001) and a last symbol (1003), respectively.

More specifically, a full OFDMA symbol section (1005) of the (M−1)-hop subframe consists of random sequences according to the subchannel allocation scheme and the transmitted data in one symbol durations, and utilizes the entire subcarrier. Since the full OFDMA symbol section (1005)

carries information available to the entire band, there is a signal at every subcarrier (1007).

Figure 1:
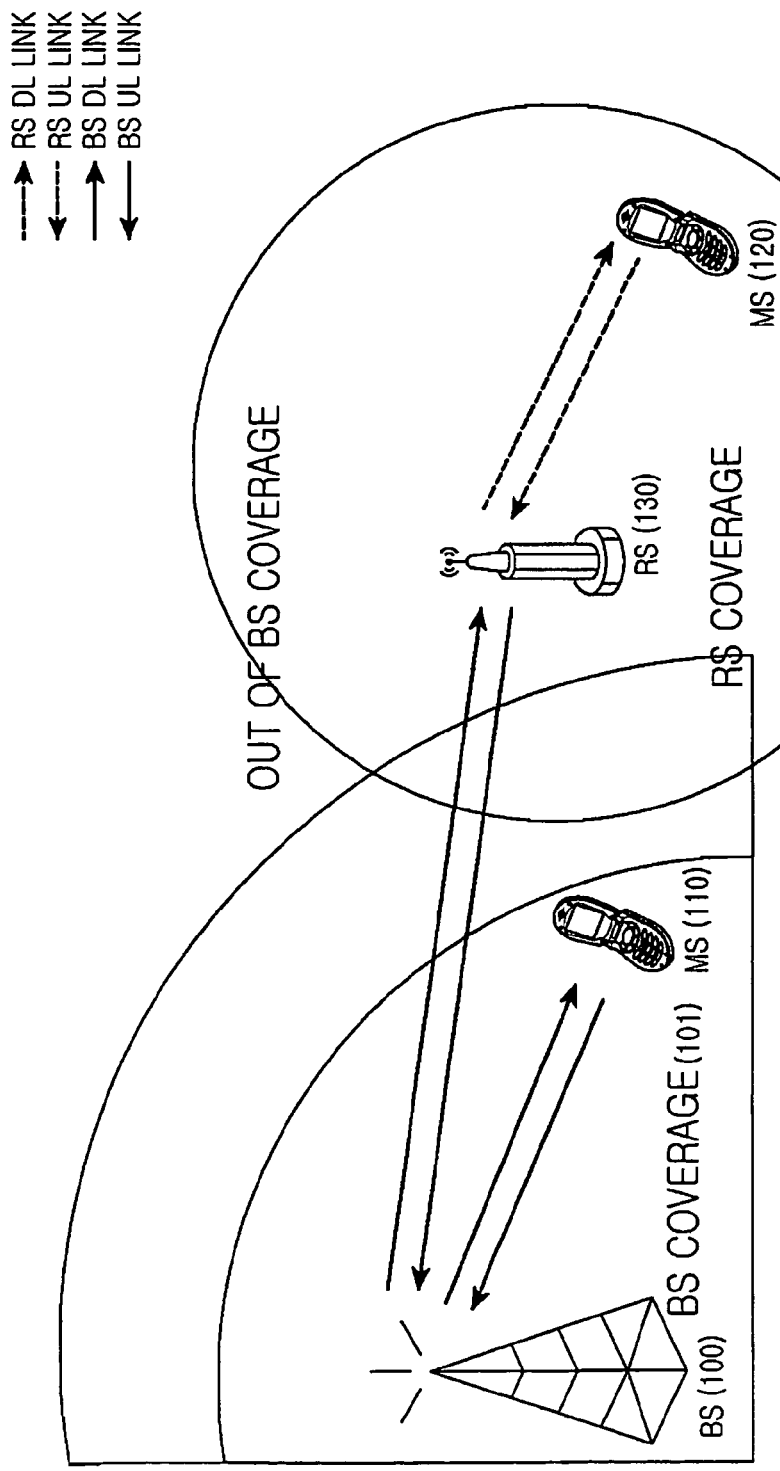
FIG. 1 illustrates a multi-link configuration of a general multi-hop relay cellular network.
Figure 2:
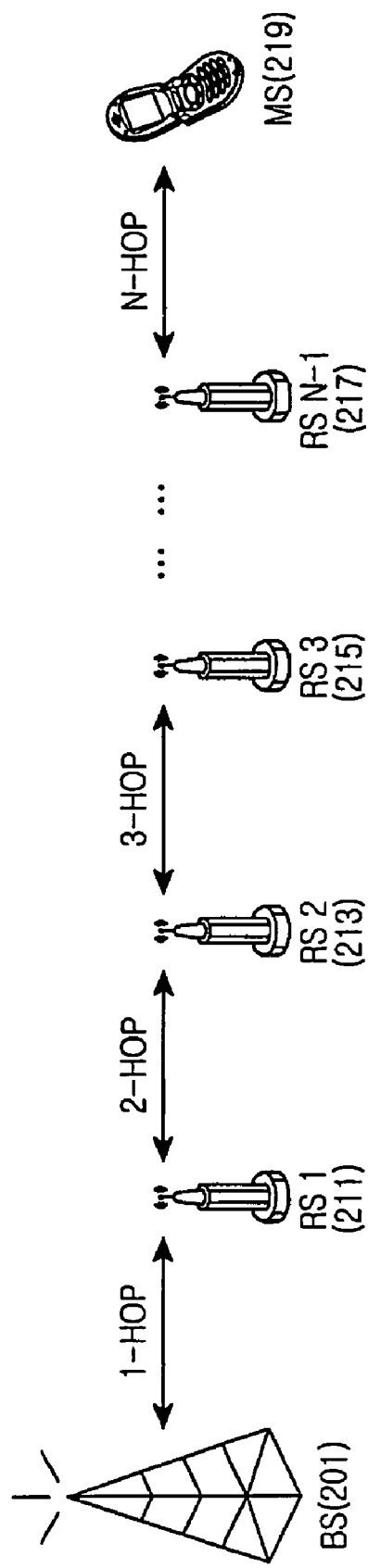
FIG. 2 illustrates a configuration of a general multi-hop cellular network.
Figure 3:
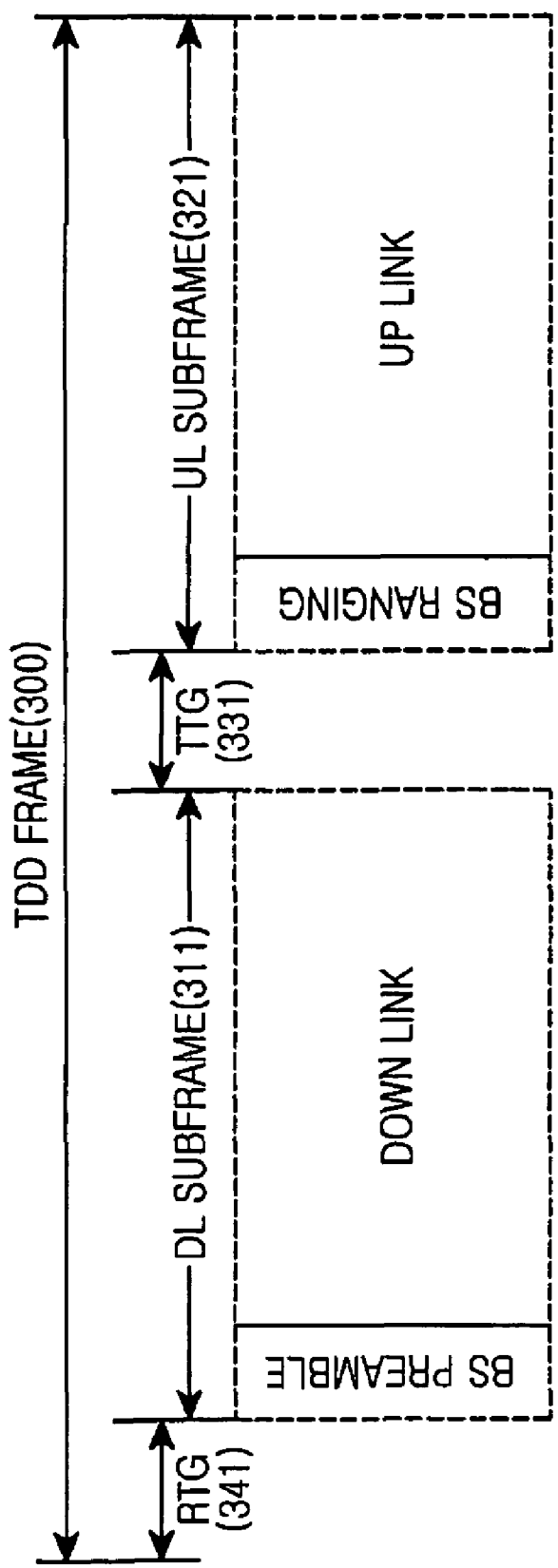
FIG. 3 illustrates a frame structure of a general multi-hop transmission TDD system.
Figure 4:
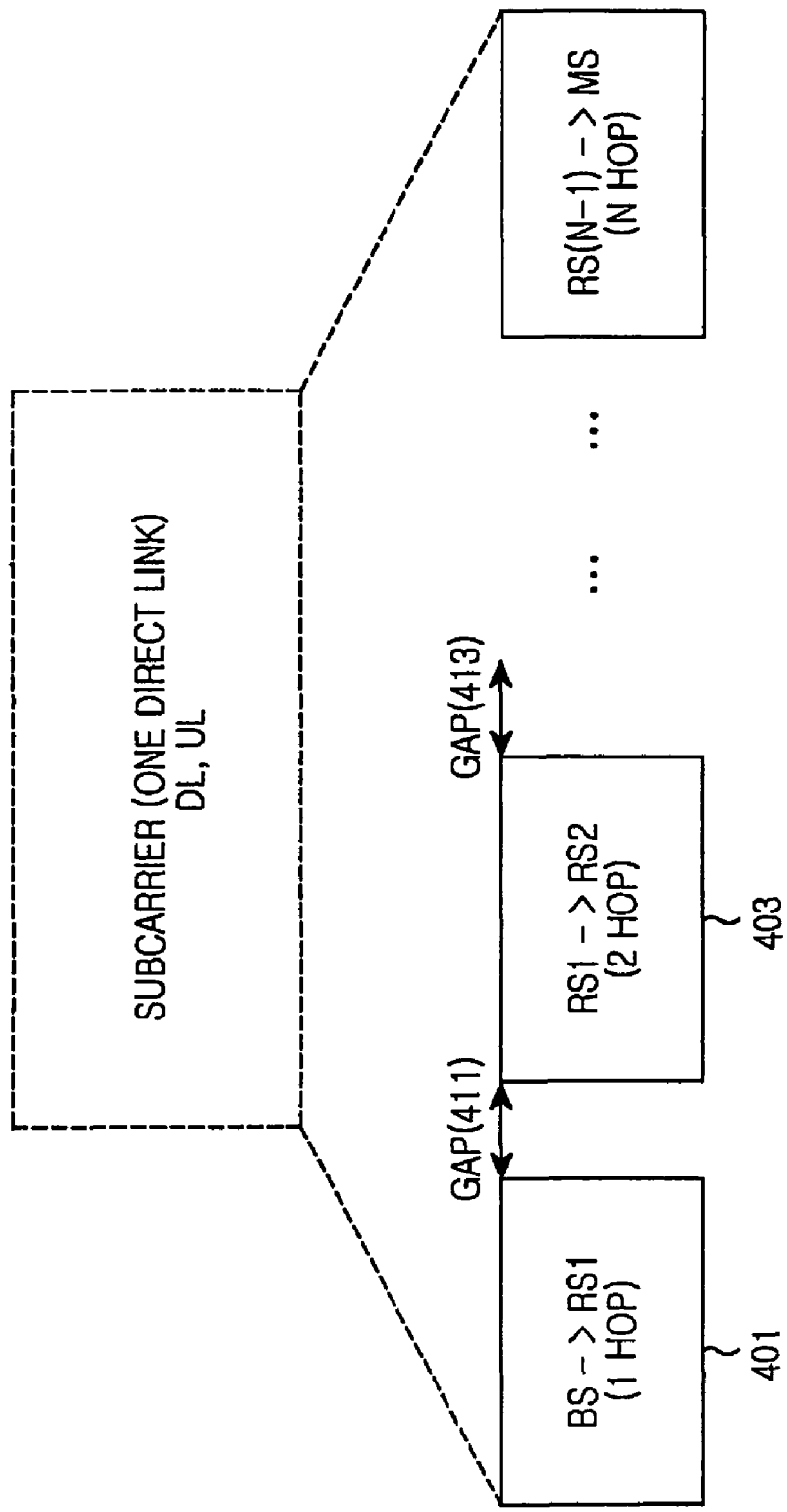
FIG. 4 illustrates a subframe structure of a general multi-hop TDD system.

In contrast, the first and last symbol (1001 and 1003), sharing the action change gap, each deliver information using subcarriers excluding the action change gap area by means of the subchannel iterative characteristic of the interleave OFDMA symbol. For instance, when the interleave OFDMA symbol is constructed such that the subchannel of the N/2-length sequence is repeated twice, the first and last symbol (1001 and 1003) use the N/2-length interval as the TTG (1003-2), i.e., the second interval of the last symbol (1003), and the RTG (1001-1), i.e., the first interval of the first symbol (1001), and carry data in the other N/2-length intervals of the symbols, i.e., the first interval (1003-1) of the last symbol (1003) and the second interval (1001-2) of the first symbol (1001). Specifically, since both the TTG and the RTG are included in the (M−1)-hop link subframe, the first ½ symbol (1001-1) and the last ½ symbol (1003-2) of the (M−1)-hop link subframe are used as the RTG and the TTG, respectively, without carrying information. In other words, signals are carried on only the even-numbered subcarriers and the odd-numbered subcarriers in the first symbol duration and the last symbol duration (1009). For instance, the subchannel is allocated in the partial OFDMA symbol using the permutation of size N/L, and the subchannel is mapped to the entire subcarrier interval to at L subcarrier intervals. In doing so, when L is 2, the signal exists as shown in FIG. 1.

As shown in FIG. 11, when L is 2, the subchannel is allocated for the partial OFDMA symbol using the permutation of size N/2 and the subcarrier in the subchannel is mapped to N-ary subcarriers at L(=2) intervals. Thus, signals reside only in the even-numbered subcarriers.

The following description exemplifies a DL transmission and reception method of an RS according to a position of the action change gap (TTG and RTG), and this method is true for the BS and the MS. Also, this method is true for an RS, a BS, and an MS, which performs the UL transmission and reception. Note that R denotes the length of the RTG interval and T denotes the length of the TTG interval.

FIG. 12 is a flowchart outlining a process to place RTG/TTG in a subframe of the multi-hop relay cellular network according to the present invention. In the following illustration, both the TTG and the RTG reside within the (M−1)-hop subframe, as illustrated in FIGS. 10 and 15A. In this case, a first action change is the RTG interval (1501) and a second action change is the TTG interval (1503). Alternatively, when the TTG and the RTG both reside within the M-hop subframe, the first action change is the TTG interval and the second action change is the RTG interval (not shown).

Referring to FIG. 12, the RS performs the RIG during the first action change interval included in a first symbol of the (M−1)-hop subframe in step 1201. For example, as shown in FIG. 15A, the first action change for the RTG (1501) is executed in the first symbol duration of the (M−1)-hop subframe. That is, the RS conducts software and hardware setup required for the transmission during the R-ary iterative intervals of the M sequence of the first symbol.

In step 1203, the RS transmits a partial OFDMA signal in intervals excluding the RTG in the first symbol duration, e.g., the second interval (1001-2) of the first symbol (1001), as illustrated in FIG. 10, that is, in the (L−R)-ary iterative intervals.

After transmitting the partial OFDMA signal, the RS transmits the OFDMA signal using the entire subcarrier of one symbol in step 1205.

In step 1207, the RS checks whether a next symbol to transmit is a last symbol of the (M−1)-hop subframe, e.g., the last symbol (1003), as illustrated in FIG. 10.

When the next symbol is not the last symbol, i.e., when the next symbol is included in the full OFDMA symbol section (1005), as illustrated in FIG. 10, the RS returns to step 1205 and sends the OFDMA signal using the entire subcarrier of the next symbol.

In contrast, when the next symbol is the last symbol, the RS transmits the partial OFDMA signal in the (L−T)-ary iterative intervals of the last symbol of the (M−1)-hop RS subframe, e.g., the first interval (1003-1) of the last symbol (1003), as illustrated in FIG. 10, in step 1209.

After sending the partial OFDMA signal, in step 1211, the RS performs the TTG during the second action change interval included in the last symbol of the (M−1)-hop RS subframe, e.g., the second interval (1003-2) of the last symbol (1003). For instance, as shown in FIG. 15A, the RS carries out the second action change for the TTG (1503) of the last symbol. In other words, the RS performs the software and hardware setup required for the reception during the T-ary iterative intervals of the last symbol.

After the action change, the RS receives the OFDMA signal using the entire subcarrier of one symbol in step 1213.

FIG. 13 is a flowchart outlining the process to place RTG/TTG in different subframes in the multi-hop relay cellular network according to the present invention. In FIG. 13, the RTG and the TTG are placed in the first symbol of different subframes. For example, as illustrated in FIG. 15B, an RTG (1511) is placed in the first symbol of the (M−1)-hop subframe and a TTG (1513) is placed in the first symbol of the (M)-hop subframe.

Referring to FIG. 13, the RS performs the RTG (1511) during the first action change interval included in a first symbol of the (M−1)-hop subframe, e.g., the first interval (1001-1) of the first symbol (1001), as illustrated in FIG. 10, in step 1301. For instance, as shown in FIG. 15B, the RS performs the first action change for the RTG (1511) in the first symbol duration of the (M−1)-hop subframe. That is, the RS conducts the software and hardware setup required for the transmission during the R-ary iterative intervals of the first symbol duration.

Next, in step 1303, the RS transmits the partial OFDMA signal in intervals, excluding the RTG, of the first symbol duration, that is, in the (L−R)-ary iterative intervals, e.g., the second interval (1001-2) of the first symbol (1001), as illustrated in FIG. 10.

After sending the partial OFDMA signal, the RS transmits the OFDMA signal using an entire subcarrier of one symbol in step 1305.

In step 1307, the RS checks whether the next symbol to transmit is the last symbol constituting the (M−1)-hop subframe.

When the next symbol is not the last symbol, the RS returns to step 1305 and sends the OFDMA signal.

When the next symbol is the last symbol, the RS transmits the last symbol and then performs the TTG (1513) during the second action change interval included in the first symbol of the (M)-hop RS subframe in step 1309. This is similar to the first interval (1001-1) of the first symbol (1001) in the (M−1)-hop subframe, as illustrated in FIG. 10, except that TTG is performed in a first interval of a first symbol in the (M)-hop subframe. For instance, as shown in FIG. 15B, the RS performs the second action change for the TTG (1513) in the first symbol duration of the (M)-hop RS sub frame. That is, the RS executes the software and hardware setup required for the reception during the T-ary iterative intervals of the first symbol duration.

Next, in step 1311, the RS receives the partial OFDMA signal in intervals, excluding the TTG, of the first symbol duration, that is, in the (L-T)-ary iterative intervals.

After receiving the partial OFDMA signal, the RS receives the OFDMA signal using the entire subcarrier of one symbol in step 1313.

FIG. 14 is a flowchart outlining a process to place RTG/TTG in different subframes in the multi-hop relay cellular network according to the present invention. In FIG. 14, the RTG and the TTG are placed in the last symbol of different subframes, as illustrated in FIG. 15C. That is, TTG (1521) is placed in a last symbol of the (M−1)-hop subframe and RTG (1523) is placed in a last symbol of the (M)-hop subframe.

Referring to FIG. 14, the RS transmits the OFDMA signal using the entire subcarrier of one symbol in the (M−1)-hop subframe in step 1401.

In step 1403, the RS checks whether a next symbol to transmit is a last symbol of the (M−1)-hop subframe.

When the next symbol is not the last symbol, the RS returns to step 1401 and transmits the OFDMA signal.

When the next symbol is the last symbol, the RS transmits the partial OFDMA signal in the (L-T)-ary iterative intervals of the last symbol duration of the (M−1)-hop RS subframe, e.g., the first interval (1003-1) of the last symbol (1003), as illustrated in FIG. 10, in step 1405.

After sending the partial OFDMA signal, in step 1407, the RS performs the TTG during the second action change interval included in the last symbol of the (M−1)-hop subframe. This is similar to the second interval (1003-2) of the last symbol (1003), as illustrated in FIG. 10. For instance, as shown in FIG. 15C, the RS performs the first action change for the TTG (1521) of the last symbol duration. That is, the RS executes the software and hardware setup required for the reception during the T-ary iterative intervals of the last symbol duration.

After the first action change for the TTG (1521), the RS receives the OFDMA signal which is transmitted using the entire subcarrier of one symbol in the (M)-hop subframe in step 1409.

In step 1411, the RS checks whether a next symbol to receive is a last symbol of the (M)-hop subframe.

When the next symbol is not the last symbol, the RS returns to step 1409 and receives the OFDMA signal in the next symbol.

However, when the next symbol is the last symbol of the (M)-hop sub frame, the RS receives the partial OFDMA signal during the (L-R)-ary iterative intervals in the last symbol duration of the (M)-hop subframe in step 1413.

After receiving the partial OFDMA signal, the RS performs the RTG during the second action change interval included to the last symbol of the (M)-hop subframe in step 1415. This is similar to the second interval (1003-2) of the last symbol (1003), as illustrated in FIG. 10, except that RTG is performed in a second interval of a last symbol in the (M)-hop subframe. For instance, as shown in FIG. 15C, the RS performs the second action change for the RTG (1523) of the last symbol duration. That is, the RS executes the software and hardware setup required for the reception during the R-ary iterative intervals of the last symbol duration.

While the above examples describe that the lengths of the TTG and the RTG between the hop subframes are equal to each other, the number of symbols occupied by each action change gap, that is, the R and the T may differ from each other.

Alternatively, the TTG and the RTG can be set to real multiples of one symbol length. For instance, the TTG and the RTG can be x.25, x.5, and x.75 (x is a positive integer) of the symbol length. In this case, the signal is not carried on the plurality of the symbol durations, but the partial symbol duration of the following or previous symbol can be configured as set forth in the present invention.

By way of another example, not every OFDMA symbol constituting one frame has the interleave-OFDMA form, and only symbols constituting the TTG or the RTG have the interleave-OFDMA form. That is, only the symbols constituting the TTG or the RTG have the M-length sequence repeating L times.

As noted above, the present invention can reduce the overhead due to the action change gap in the multi-hop relay cellular network by flexibly controlling the action change gap by means of the sequence iteration characteristic of the interleave-OFDMA signal. Therefore, the system capacity and the system efficiency can be raised.

While the invention has been shown and described with reference to certain preferred embodiments thereof, it will be understood by those skilled in the art that various changes in form and details may be made therein without departing from the spirit and scope of the invention as further defined by the appended claims.

What is claimed is:

1. An operating method of a relay station (RS) to control an action change gap interval in a cellular network, the method comprising:
    transmitting data in a second interval of a first symbol included in a first subframe, after performing a first action change in a first interval of the first symbol included in the first subframe, wherein the first interval of the first symbol is a first action change gap;
    performing a second action change in a second interval of a last symbol of the first subframe, after transmitting data in a first interval of the last symbol included in the first subframe, wherein the second interval of the last symbol is a second action change gap; and
    receiving data in a second subframe.

2. The operating method of claim 1, further comprising generating the first symbol,
    wherein generating the first symbol comprises:
        generating a subchannel mapped to a certain number of subcarriers;
        repeatedly mapping the subchannel to an entire band of a symbol at uniform intervals; and
        removing the subchannel mapped to the first action change gap from the first symbol.

3. The operating method of claim 1, further comprising generating the last symbol,
    wherein generating the last symbol comprises:
        generating a subchannel mapped to a certain number of subcarriers;
        repeatedly mapping the subchannel to an entire band of a symbol at uniform intervals; and
        removing the subchannel mapped to the second action change gap from the last symbol.

4. The operating method of claim 1, wherein the first action change gap of the first symbol is a receive/transmit transition gap (RTG) and the second action change gap of the last symbol is a transmit/receive transition gap (TTG).

5. The operating method of claim 1, wherein the first action change gap of the first symbol and the second action change gap of the last symbol have a same length.

6. The operating method of claim 1, wherein the first action change gap of the first symbol and the second action change gap of the last symbol have different lengths.

7. The operating method of claim 1, further comprising:
transmitting data using all remaining symbols of the first subframe.

8. An operating method of a Relay Station (RS) to control an action change gap interval in a cellular network, the method comprising:
receiving data in a second interval of a first symbol included in a first subframe, after performing a first action change in a first interval of the first symbol included in the first subframe, wherein the first interval of the first symbol is a first action change gap;
receiving data in a first interval of a last symbol included in the first subframe;
performing a second action change in a second interval of the last symbol included in the first subframe, wherein the second interval of the last symbol is a second action change gap; and
transmitting data in a second subframe.

9. The operating method of claim 8, further comprising:
receiving data using all remaining symbols of the first subframe.

10. An operating method of a Relay Station (RS) to control an action change gap interval in a cellular network, the method comprising:
transmitting data in a second interval of a first symbol included in a first subframe, after performing a first action change in a first interval of the first symbol included in the first subframe, wherein the first interval of the first symbol included in the first subframe is a first action change gap; and
receiving data in a second interval of a first symbol included in a second subframe, after performing a second action change in a first interval of the first symbol included in the second subframe, wherein the first interval of the first symbol included in the second subframe is a second action change gap.

11. The operating method of claim 10, further comprising generating the first symbol included in the first subframe,
wherein generating the first symbol comprises:
generating a subchannel mapped to a certain number of subcarriers;
repeatedly mapping the subchannel to an entire band of a symbol at uniform intervals; and
removing the subchannel mapped to the first action change gap from the first symbol.

12. The operating method of claim 10, wherein the first action change gap is a receive/transmit transition gap (RTG) and the second action change gap is a transmit/receive transition gap (TTG).

13. The operating method of claim 10, wherein the first action change gap and the second action change gap have a same length.

14. The operating method of claim 10, wherein the first action change gap and the second action change gap have different lengths.

15. The operating method of claim 10, further comprising:
transmitting data using all remaining symbols of the first subframe; and
receiving data using all remaining symbols of the second subframe.

16. An operating method of a Relay Station (RS) to control an action change gap interval in a cellular network, the method comprising:
receiving data in a second interval of a first symbol included in a first subframe, after performing a first action change in a first interval of the first symbol included in the first subframe, wherein the first interval of the first symbol included in the first subframe is a first action change gap; and
transmitting data in a second interval of a first symbol included in a second subframe, after performing a second action change in a first interval of the first symbol included in the second subframe, wherein the first interval of the first symbol included in the second subframe is a second action change gap.

17. The operating method of claim 16, further comprising:
receiving data using all remaining symbols of the first subframe; and
transmitting data using all remaining symbols of the second subframe.

18. An operating method of a Relay Station (RS) to control an action change gap interval in a cellular network, the method comprising:
performing a first action change in a second interval of a last symbol included in a first subframe, after transmitting data in a first interval of the last symbol included in the first subframe, wherein the second interval of the last symbol included in the first subframe is a first action change gap; and
performing a second action change in a second interval of a last symbol included in a second subframe, after receiving data in a first interval of the last symbol included in the second subframe, wherein the second interval of the last symbol included in the second subframe is a second action change gap.

19. The operating method of claim 18, further comprising generating the last symbol included in the first subframe,
wherein generating the last symbol comprises:
generating a subchannel mapped to a certain number of subcarriers;
repeatedly mapping the subchannel to an entire band of a symbol at uniform intervals; and
removing the subchannel mapped to the first action change gap from the last symbol.

20. The operating method of claim 19, wherein a length of the first action change gap is smaller than or equal to a length of one symbol.

21. The operating method of claim 18, wherein the second action change gap is a receive/transmit transition gap (RTG) and the first action change gap is a transmit/receive transition gap (TTG).

22. The operating method of claim 18, further comprising:
transmitting data using all remaining symbols of the first subframe; and
receiving data using all remaining symbols of the second subframe.

23. The operating method of claim 18, wherein the first action change gap and the second action change gap have a same length.

24. The operating method of claim 18, wherein the first action change gap and the second action change gap have different lengths.

25. An operating method of a Relay Station (RS) to control an action change gap interval in a cellular network, the method comprising:
performing a first action change in a second interval of a last symbol included in a first subframe, after receiving data in a first interval of the last symbol included in the first subframe, wherein the second interval of the last symbol included in the first subframe is a first action change gap; and performing a second action change in a second interval of a last symbol included in a second subframe, after transmitting data in a first interval of the last symbol included in the second subframe, wherein the second interval of the last symbol included in the second subframe is a second action change gap.

26. The operating method of claim 25, further comprising:
receiving data using all remaining symbols of the first subframe; and
transmitting data using all remaining symbols of the second subframe.

27. A subframe construction method by a transmitter to control an action change gap in a cellular network, the method comprising:
constructing, by the transmitter, a first symbol included in a first subframe as a first interval for a first action change and a second interval for exchanging data, wherein the first interval of the first symbol is a first action change gap; and
constructing a last symbol included in the first subframe as a first interval for exchanging data and a second interval for a second action change, wherein the second interval of the last symbol is a second action change gap.

28. The subframe construction method of claim 27, wherein the first action change gap is a receive/transmit transition gap (RTG) and the second action change gap is a transmit/receive transition gap (TTG).

29. A subframe construction method by a transmitter to control an action change gap in a cellular network, the method comprising:
constructing, by the transmitter, a first symbol included in a first subframe as a first interval for a first action change and a second interval for exchanging data, wherein the first interval of the first symbol included in the first subframe is a first action change gap; and
constructing a first symbol included in a second subframe as a first interval for a second action change and a second interval for exchanging data, wherein the first interval of the first symbol in the second subframe is a second action change gap.

30. The subframe construction method of claim 29, wherein the first action change gap is a receive/transmit transition gap (RTG) and the second action change gap is a transmit/receive transition gap (TTG).

31. A subframe construction method by a transmitter to control an action change gap in a cellular network, the method comprising:
constructing, by the transmitter, a last symbol included in a first subframe as a first interval for exchanging data and a second interval for a first action change, wherein the second interval of the last symbol included in the first subframe is a first action change gap; and
constructing a last symbol included to a second subframe as a first interval for exchanging data and a second interval for a second action change, wherein the second interval of the last symbol included in the second subframe is a second action change gap.

32. The subframe construction method of claim 31, wherein the first action change gap is a receive/transmit transition gap (RTG) and the second action change gap is a transmit/receive transition gap (TTG).

33. A frame construction method by a transmitter to control an action change gap in a cellular network, the method comprising:
constructing, by the transmitter, a first symbol included in a first frame as a first interval for a first action change and a second interval for exchanging data, wherein the first interval of the first symbol is a first action change gap; and
constructing a last symbol included to the first frame as a first interval for exchanging data and a second interval for a second action change, wherein the second interval of the last symbol is a second action change gap.

34. The frame construction method of claim 33, wherein the first action change gap is a receive/transmit transition gap (RTG) and the second action change gap is a transmit/receive transition gap (TTG).

35. A frame construction method by a transmitter to control an action change gap in a cellular network, the method comprising:
constructing, by the transmitter, a first symbol included in a first frame as a first interval for a first action change and a second interval for exchanging data, wherein the first interval of the first symbol included in the first subframe is a first action change gap; and
constructing a first symbol included in a second frame as a first interval for a second action change and a second interval for exchanging data, wherein the first interval of the first symbol included in the second subframe is a second action change gap.

36. The frame construction method of claim 35, wherein the first action change gap is a receive/transmit transition gap (RTG) and the second action change gap is a transmit/receive transition gap (TTG).

37. A frame construction method by a transmitter to control an action change gap in a cellular network, the method comprising:
constructing, by the transmitter, a last symbol included in a first frame as a first interval for exchanging data and a second interval for a first action change, wherein the second interval of the last symbol included in the first subframe is a first action change gap; and
constructing a last symbol included to a second frame as a first interval for exchanging data and a second interval for a second action change, wherein the second interval of the last symbol included in the second subframe is a second action change gap.

38. The frame construction method of claim 37, wherein the first action change gap is a receive/transmit transition gap (RTG) and the second action change gap is a transmit/receive transition gap (TTG).

* * * * *